United States Patent
Kawaji et al.

(10) Patent No.: US 7,095,208 B2
(45) Date of Patent: Aug. 22, 2006

(54) INVERTER CONTROLLER FOR DRIVING MOTOR AND AIR CONDITIONER USING INVERTER CONTROLLER

(75) Inventors: Mitsuo Kawaji, Sakata-gun (JP); Hideo Matsushiro, Kusatsu (JP); Tomohiro Sugimoto, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 64 days.

(21) Appl. No.: 10/811,963

(22) Filed: Mar. 30, 2004

(65) Prior Publication Data

US 2004/0217728 A1 Nov. 4, 2004

(30) Foreign Application Priority Data

Apr. 3, 2003 (JP) .......................................... 2003-100007
Mar. 16, 2004 (JP) ....................................... 2004-074852

(51) Int. Cl.
*H02P 5/28* (2006.01)
*H02P 7/34* (2006.01)

(52) U.S. Cl. ....................... 318/801; 318/802; 318/811; 318/729; 318/438; 318/52; 318/812

(58) Field of Classification Search ................ 318/801, 318/802, 811, 729, 438, 52, 713
See application file for complete search history.

(56) References Cited

U.S. PATENT DOCUMENTS

| 4,992,718 A | * | 2/1991 | Kumaki ........................ 318/768 |
| 5,206,575 A | * | 4/1993 | Nakamura et al. ........... 318/807 |
| 5,457,375 A | * | 10/1995 | Marcinkiewicz et al. ... 318/802 |
| 5,481,451 A | | 1/1996 | Kuwahara |
| 5,532,569 A | | 7/1996 | Tanamachi et al. |
| 5,561,595 A | * | 10/1996 | Smith ........................... 363/37 |
| 5,583,412 A | | 12/1996 | Nielsen |
| 5,723,968 A | * | 3/1998 | Sakurai ........................ 318/802 |
| 6,002,218 A | * | 12/1999 | Toda et al. ................... 318/66 |
| 6,191,545 B1 | * | 2/2001 | Kawabata et al. ........... 318/439 |

(Continued)

FOREIGN PATENT DOCUMENTS

| EP | 0 488 163 A | | 6/1992 |
| EP | 1 152 521 | | 11/2001 |
| JP | 60-219996 | | 11/1985 |
| JP | 4-210800 | | 7/1992 |
| JP | 9-266674 | | 10/1997 |
| JP | 11308894 A | * | 11/1999 |
| WO | WO 3081765 A1 | * | 10/2003 |

OTHER PUBLICATIONS

"Inverter Drive Handbook", compiled by Editing Committee of Drive Handbook, first edition in 1995, published by Nikkan Kogyo Shimbun, Ltd., along with English translation of a related part, pp. 661–711.

(Continued)

*Primary Examiner*—Marlon T. Fletcher
*Assistant Examiner*—Patrick Miller
(74) *Attorney, Agent, or Firm*—Wenderoth, Lind & Ponack, L.L.P.

(57) ABSTRACT

A reactor having a predetermined small capacity is connected to a rectifier, and a capacitor having a predetermined small capacity is connected between DC bus lines of the inverter, so that a small, light and low-cost inverter controller for driving a motor can be implemented, and even when an inverter DC voltage largely fluctuates and it is difficult to drive the motor, the motor can be kept driving by operating the inverter such that a voltage applied to the motor may stay constant by a motor voltage command corrector which generates a motor voltage command correction value of the motor.

9 Claims, 14 Drawing Sheets

U.S. PATENT DOCUMENTS

| | | | | |
|---|---|---|---|---|
| 6,229,278 | B1 * | 5/2001 | Garces et al. | 318/801 |
| 6,313,602 | B1 | 11/2001 | Arefeen et al. | |
| 6,337,548 | B1 * | 1/2002 | Kawabata et al. | 318/439 |
| 6,414,455 | B1 * | 7/2002 | Watson | 318/432 |
| 6,489,692 | B1 * | 12/2002 | Gilbreth et al. | 290/52 |
| 6,512,341 | B1 * | 1/2003 | Matsushiro et al. | 318/254 |
| 6,687,139 | B1 * | 2/2004 | Tanikawa et al. | 363/37 |
| 6,768,284 | B1 * | 7/2004 | Lee et al. | 318/808 |
| 6,822,417 | B1 * | 11/2004 | Kawaji et al. | 318/701 |
| 2004/0124807 | A1 * | 7/2004 | Nakata et al. | 318/801 |
| 2004/0207360 | A1 * | 10/2004 | Matsushiro et al. | 318/811 |
| 2004/0228151 | A1 * | 11/2004 | Matsushiro et al. | 363/37 |
| 2004/0232876 | A1 * | 11/2004 | Matsushiro et al. | 318/801 |
| 2004/0232877 | A1 * | 11/2004 | Kawaji et al. | 318/802 |
| 2004/0246641 | A1 * | 12/2004 | Sugimoto et al. | 361/91.1 |
| 2005/0007061 | A1 * | 1/2005 | Hofmann et al. | 318/701 |

OTHER PUBLICATIONS

U.S. Appl. No. 2002/190685A1, filed Dec. 2002, Sadasivam et al.

Lin W M et al: "A new topology for passive PFC circuit design to allow AC–to–DC converters to comply with the new version of IEC 1000–3–2 regulations" 33rd, Annual IEEE Power Electronics Specialists Conference, Pesc 2002. Conference Proceedings, Cairns, Queensland, Australia, Jun. 23–27, 2002, Annual Power Electronics Specialists Conference, New York, NY; IEEE. US, vol. 2 of 4, Conf. 33, Jun. 23, 2002, pp. 2050–2055, XP010596051.

Jovanovic M M et al: "Merits and limitations of full–bridge rectifier with LC filter in meeting IEC 1000–3–2 harmonic–limit specifications" Applied Power Electronics Conference and Exposition, 1996. APEC '96. Conference Proceedings 1996. Eleventh Annual San Jose, Ca, USA Mar. 3–7, 1996. New York, NY, USA, IEEE, US, vol. 1, 3 Mar 1996, pp. 354–360, XP010159776.

Lin W M et al: "Design of the basic rectifier with LC filter to comply with the new edition of the IEC1000–3–2 current harmonic–limit specifications (Edition 2.0)" APEC 2002. 17$^{th}$ Annual IEEE Applied Power Electronics Conference and Exposition, Dallas, TX, Mar. 10–14, 2002, Annual Applied Power Electronics Conference, New York, NY: IEEE, US, vol. 2 of 2, Conf. 17, 10 Mar. 2002, pp. 1215–1220, XP010583071.

* cited by examiner

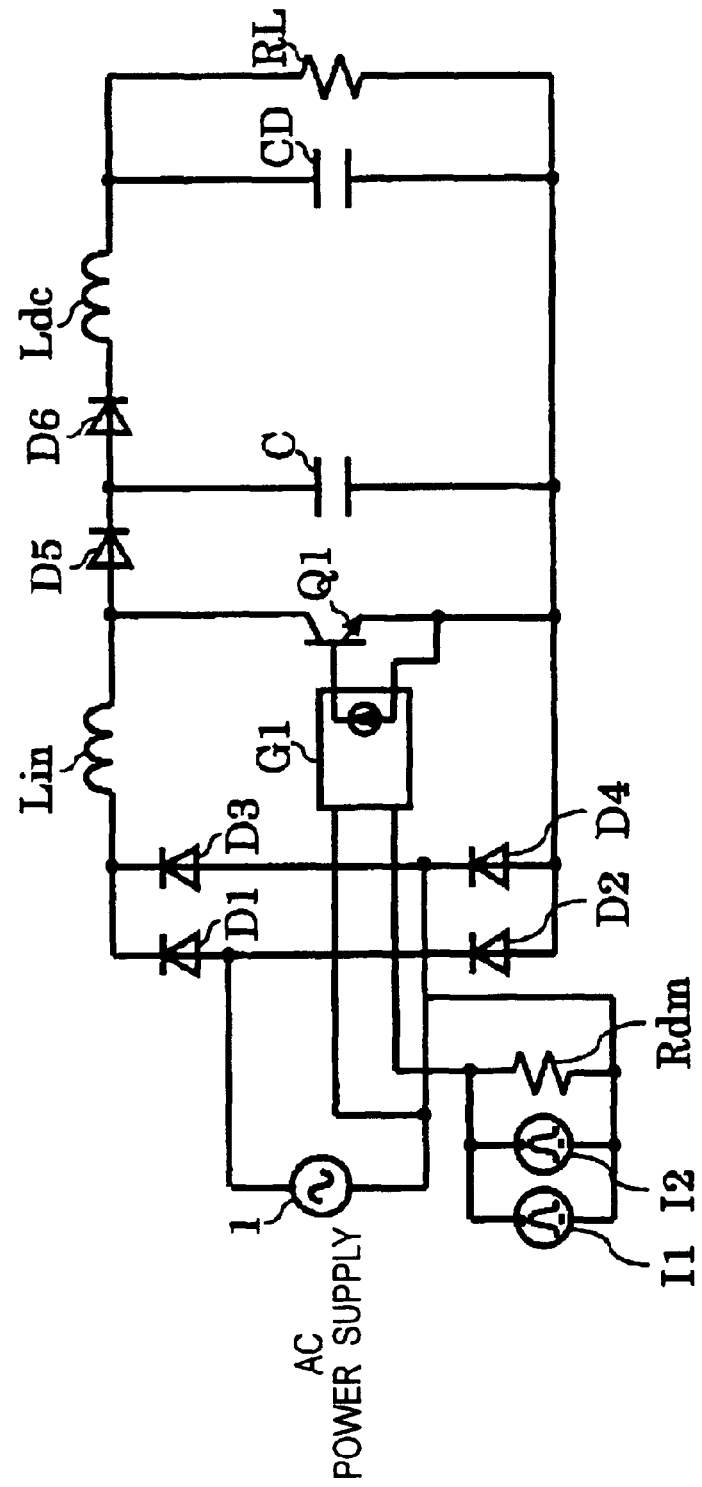
Fig.14 *PRIOR ART*

INVERTER CONTROLLER FOR DRIVING MOTOR AND AIR CONDITIONER USING INVERTER CONTROLLER

BACKGROUND OF THE INVENTION

1. Field of the Invention

The present invention relates to an inverter controller for driving a motor, which uses a small-capacity reactor and a small-capacity capacitor, and also relates to an air conditioner using such an inverter controller as an inverter apparatus.

2. Description of the Related Art

As a general inverter controller for driving an induction motor used in an all-purpose inverter and the like, a V/F control type of inverter controller for driving an induction motor shown in FIG. 11 is well-known as disclosed, for example, in a non-patent document 1 (see page 661 to 711 in "Inverter Drive Handbook", compiled by an editing committee of the Drive Handbook, first edition in 1995, published by THE NIKKAN KOGYO SHIMBUN, LTD, for example).

Referring to FIG. 11, a main circuit includes a DC power supply apparatus 113, an inverter 3 and an induction motor 4. The DC power supply apparatus 113 includes an AC power supply 1, a rectifier 2, a smoothing capacitor 112 storing electric energy for a DC voltage source of the inverter 3, and a reactor 111 for improving a power factor of the AC power supply 1.

Meanwhile, a control circuit includes a V/F control pattern section 13, a motor voltage command generator 14 and a PWM controller 18. The V/F control pattern section 13 is provided for deciding a motor voltage value applied to the induction motor 4 based on a speed command $\omega^*$ of the induction motor 4 applied from the outside. The motor voltage command generator 14 is provided for generating a motor voltage command value of the induction motor 4 based on the motor voltage value decided by the V/F control pattern section 13. The PWM controller 18 is provided for generating a PWM signal of the inverter 3 based on the motor voltage command value generated by the motor voltage command generator 14.

FIG. 12 shows an example of the general V/F control pattern generated by the V/F control pattern section 13. As shown in FIG. 12, it is constituted such that the motor voltage value applied to the induction motor 4 is unambiguously decided in relation to the speed command $\omega^*$. In general, the speed command $\omega^*$ and the motor voltage value are stored in a memory of a calculating device such as a microcomputer as table values, and the motor voltage value is provided by liner interpolation from the table values for the other speed command $\omega^*$ which is not included in the table values.

Here, when the AC power supply 1 is 220 V (AC power supply frequency is 50 Hz), the input of the inverter 3 is 1.5 kW, and the smoothing capacitor 112 is 1500 µF, a relation between a harmonic component of an AC power supply current and an order to an AC power supply frequency when the reactor 111 for improving the power factor is 5 mH and 20 nH is shown in FIG. 13.

FIG. 13 shows the relation together with the IEC (International Electrotechnical Commission) standard, from which it is seen that the third harmonic component especially largely exceeds that of the IEC standard when the reactor 111 for improving the power factor is 5 mH.

Meanwhile, the IEC standard is satisfied until the fortieth harmonic component in the case of 20 mH.

Thus, it is necessary to take measure to further increase an inductance value of the reactor 111 for improving the power factor in order to clear the IEC standard at the time of especially high loading, and it causes the inverter to increase in size and weight, which increases in cost.

Therefore, there is proposed a DC power supply apparatus shown in FIG. 14, for example, in a patent document 1 (Japanese Patent Unexamined Laid-open Publication H9-266674). Referring to FIG. 14, a DC power supply apparatus is improved to prevent an increase of the inductance value of the reactor 111 to increase the power factor, while reducing the power supply harmonic component and increasing the power factor.

In FIG. 14, an AC power supply voltage of an AC power supply 1 is applied to an AC input terminal of a full-wave rectifier constructed by bridge connection of diodes D1 through D4, the output thereof is charged into a middle capacitor C through a reactor Lin, the charges of the middle capacitor C is discharged to a smoothing capacitor CD and a DC voltage is supplied to a load resistance RL. In this constitution, a transistor Q1 is connected in a negative and positive DC current path connecting a loading side of the reactor Lin to the middle capacitor C, and this transistor Q1 is driven by a base driving circuit G1.

In addition, pulse generation circuits I1 and I2 applying a pulse voltage to the base driving circuit G1, and a dummy resistance Rdm are further provided. Each of the pulse generation circuits I1 and I2 comprises a circuit for detecting a zero cross point of the AC power supply voltage and a pulse current circuit for applying a pulse current to the dummy resistance Rdm after the zero cross point is detected until an instantaneous value of the AC power supply voltage becomes equal to a voltage at both ends of the middle capacitor C.

Here, the pulse generation circuit I1 generates a pulse voltage in the former half of a half-cycle of the AC power supply voltage, and the pulse generation circuit I2 generates a pulse voltage in the latter half of the half-cycle of the AC power supply voltage.

In addition, when a current is forced to flow in the reactor Lin by turning the transistor Q1 on, a diode D5 for backflow prevention is connected such that the charge in the middle capacitor C may not be discharged through the transistor Q1, and a diode D6 for backflow prevention and a reactor Ldc for increasing a smoothing effect are connected in series in a path in which the charge in the middle capacitor C is discharged to the smoothing capacitor CD.

In the above constitution, the transistor Q1 is turned on at a part or a whole of a phase section in which the instantaneous value of the AC power supply voltage does not exceed the voltage at both ends of the middle capacitor C, and thus the harmonic component is reduced and a high power factor is attained without making the apparatus large.

However, in the above conventional constitution as disclosed in the patent document 1 which describes a simulation result in the case of 1500 µF and 6.2 mH, the smoothing capacitor CD and the reactor Lin having large capacity are still provided, and the middle capacitor C, the transistor Q1, the base driving circuit G1, the pulse generation circuits I1 and I2, the dummy resistance Rdm, the diodes D5 and D6 for backflow prevention, and the rector Ldc enhancing the smoothing effect are further provided. Therefore, the apparatus becomes large in size and its cost is increased because the number of parts is increased.

SUMMARY OF THE INVENTION

The present invention has been made to solve the above conventional problems and has an essential object to provide a small in size, light in weight and low-cost inverter controller for driving a motor.

In order to achieve the object, the present invention provides an inverter controller for driving a motor, which includes: an AC power supply for supplying an AC power; a rectifier formed of a diode bridge for rectifying the AC power to be converted to DC power; a reactor having a predetermined small capacity which is connected to the rectifier, for improving a power factor of the AC power supply; an inverter which converts the DC power to AC power for driving the motor; and a capacitor having a predetermined small capacity which is connected between DC bus lines of the inverter to absorb regeneration energy from the motor.

The inverter controller further includes: a motor voltage command generator which generates a motor voltage command value of the motor, based on a speed command value of the motor applied from the outside; a positive neutral (PN) voltage detector which detects a DC voltage value of the inverter; a PN voltage corrector which calculates a ratio of the DC voltage detection value of the inverter obtained by the PN voltage detector to a predetermined DC voltage reference value of the inverter to thereby generate a PN voltage correction factor; and a motor voltage command corrector which generates a motor voltage command correction value of the motor.

Preferably, the motor voltage command corrector obtains the motor voltage command correction value of the motor by multiplying the motor voltage command value obtained by the motor voltage command generator by the PN voltage correction factor which is generated by the PN voltage corrector.

By this constitution, a small, light and low-cost inverter controller for driving the motor can be implemented by using the small-capacity reactor and the small-capacity capacitor. As a result, even when it is difficult or impossible to drive the motor because the inverter DC voltage largely fluctuates, the motor can be kept driving by operating the inverter so that the voltage applied to the motor may stay almost constant.

Preferably, the PN voltage corrector provides the PN voltage correction factor by dividing the DC voltage reference value by the DC voltage detection value, and sets a predetermined maximum value of the PN voltage correction factor as the PN voltage correction factor when the DC voltage detection value is zero or less.

By this constitution, the motor can be kept driving even when the inverter DC voltage largely fluctuates to be zero or less.

Still further, preferably, the PN voltage correction factor generated by the PN voltage corrector has at least a predetermined upper limit value or a predetermined lower limit value.

By this constitution, the motor can be kept driving even when the inverter DC voltage largely fluctuates, the AC power supply current can be prevented from fluctuating because the predetermined upper limit value or the lower limit value is provided, the AC power supply power factor can be improved, and the harmonic component of the AC power supply current can be prevented.

Still further, preferably, the PN voltage corrector increases the PN voltage correction factor in proportion to the DC voltage detection value when the DC voltage detection value is larger than the DC voltage reference value.

By this constitution, the motor can be kept driving even when the inverter DC voltage largely fluctuates, and the output torque of the motor can be improved by increasing the PN voltage correction factor when the inverter DC voltage is more than the DC voltage reference value.

Still further, preferably, an inverter operation frequency is prevented from being constantly fixed at a resonant frequency in which the inverter operation frequency is an even-numbered multiple of an AC power supply frequency and in a range having a predetermined frequency width around the resonant frequency.

By this constitution, an unstable operation of the motor can be prevented by avoiding a resonant phenomenon between the inverter frequency and the AC power supply frequency, and the stable driving can be implemented.

Still further, preferably, a combination of the small-capacity reactor and the small-capacity capacitor is decided so that a resonant frequency between the small-capacity reactor and the small-capacity capacitor is made larger than the forty-fold of the AC power supply frequency.

By this constitution, the harmonic component of the AC power supply current can be prevented and the IEC standard can be satisfied.

Still further, preferably, the capacity of the small-capacity capacitor is decided so that a maximum value of the DC voltage value, which increases when the inverter stops, is made smaller than a withstand voltage of the capacitor.

By this constitution, the peripheral circuit can be prevented from being destroyed by deciding the capacity of the small-capacity capacitor so that the maximum value of the inverter DC voltage may be smaller than the withstand voltage of each driving element.

Still further, preferably, a carrier frequency of the inverter is decided so as to satisfy a predetermined AC power supply power factor value.

By this constitution, the predetermined AC power supply power factor value can be satisfied and the inverter loss can be suppressed to the requisite minimum by setting the carrier frequency at the requisite minimum.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 14 is a circuit diagram showing a prior art DC power supply apparatus.

DESCRIPTION OF THE PREFERRED EMBODIMENTS

Embodiments of the present invention are described hereinafter with reference to the drawings. It is to be noted here that, although the following description is made referring to an inverter controller for driving an induction motor, the present invention is not limited to this and can be applied to an inverter controller for driving any type of motor.

Embodiment 1

Figure 1:
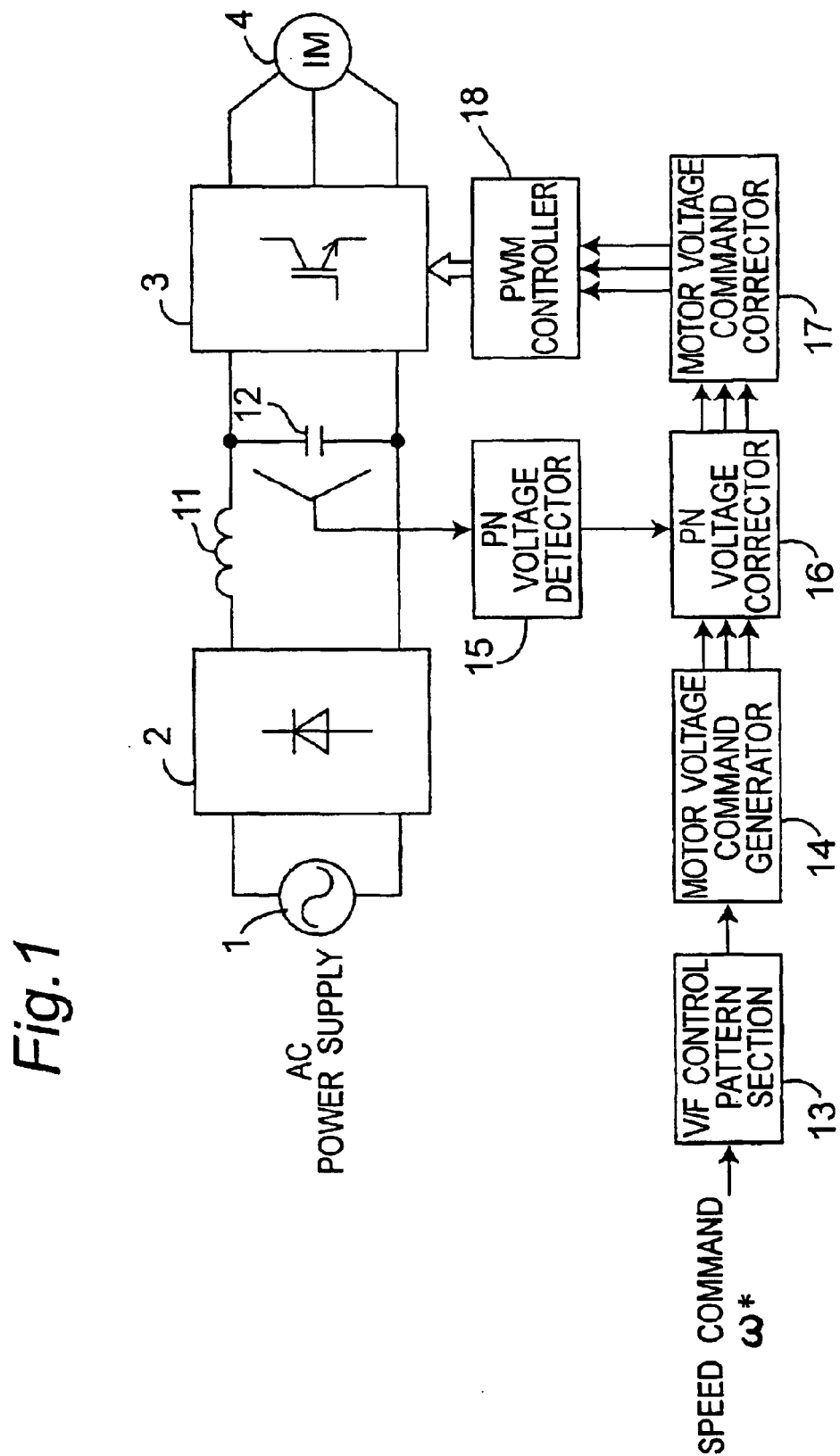
FIG. 1 is a block diagram showing a system constitution of an inverter controller for driving an induction motor according to a first embodiment of the present invention.

FIG. 1 shows a system constitution of an inverter controller for driving an induction motor according to a first embodiment of the present invention. Referring to FIG. 1, a main circuit of the system constitution includes an AC power supply 1, a diode bridge 2 for converting AC power to DC power, a small-capacity reactor 11, a small-capacity capacitor 12, an inverter 3 for converting DC power to AC power, and an induction motor 4 driven by the AC power converted by the inverter 3.

Figure 11:
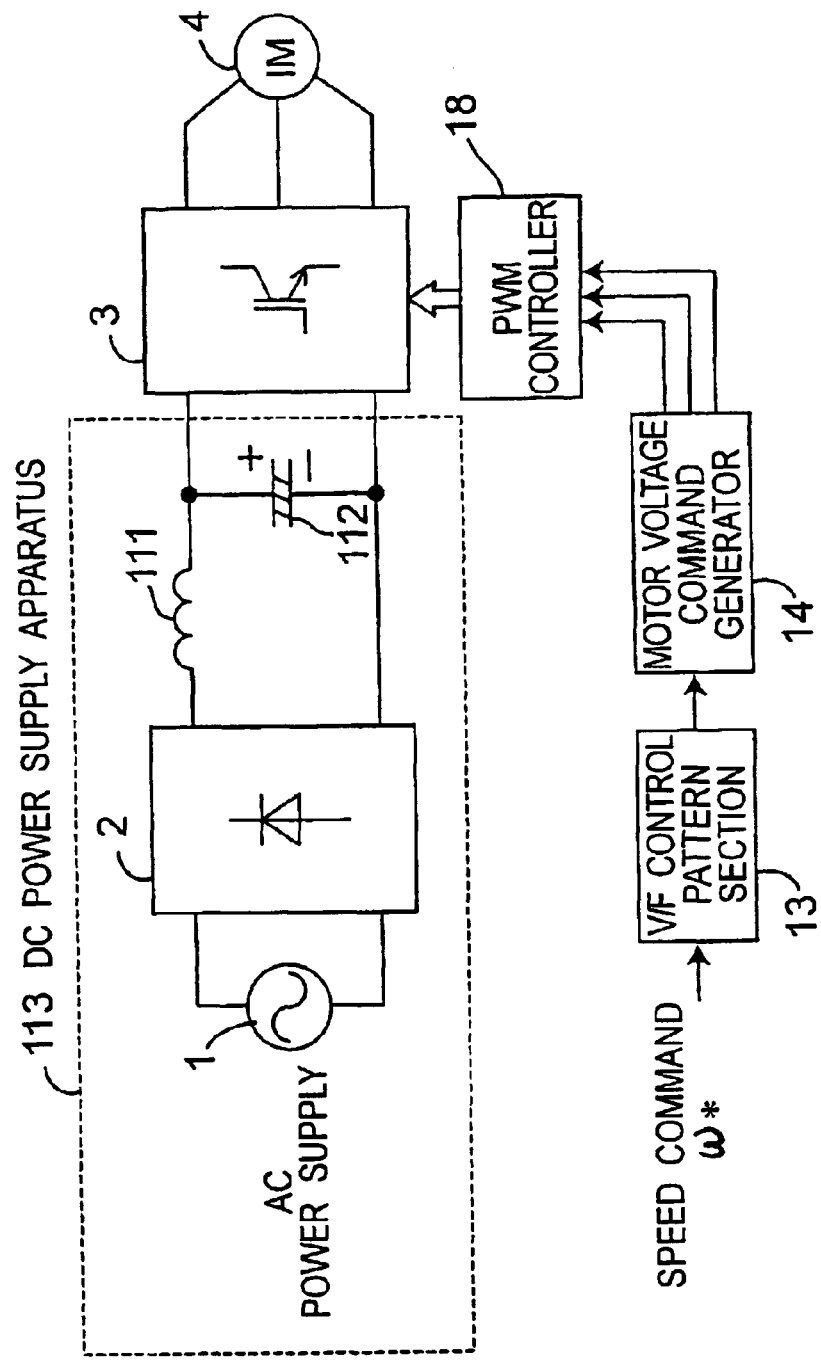
FIG. 11 is a block diagram showing a system constitution of a prior art inverter controller for driving an induction motor.
Figure 12:
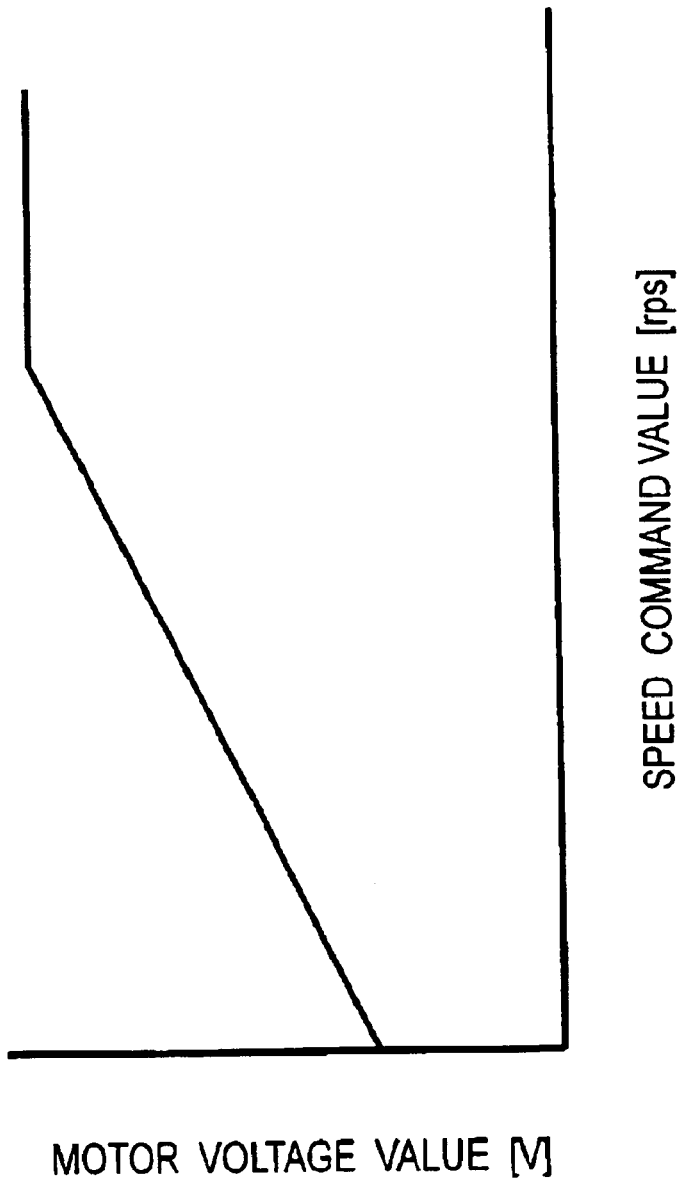
FIG. 12 is a graph view showing an example of a prior art V/F control pattern.
Figure 13:
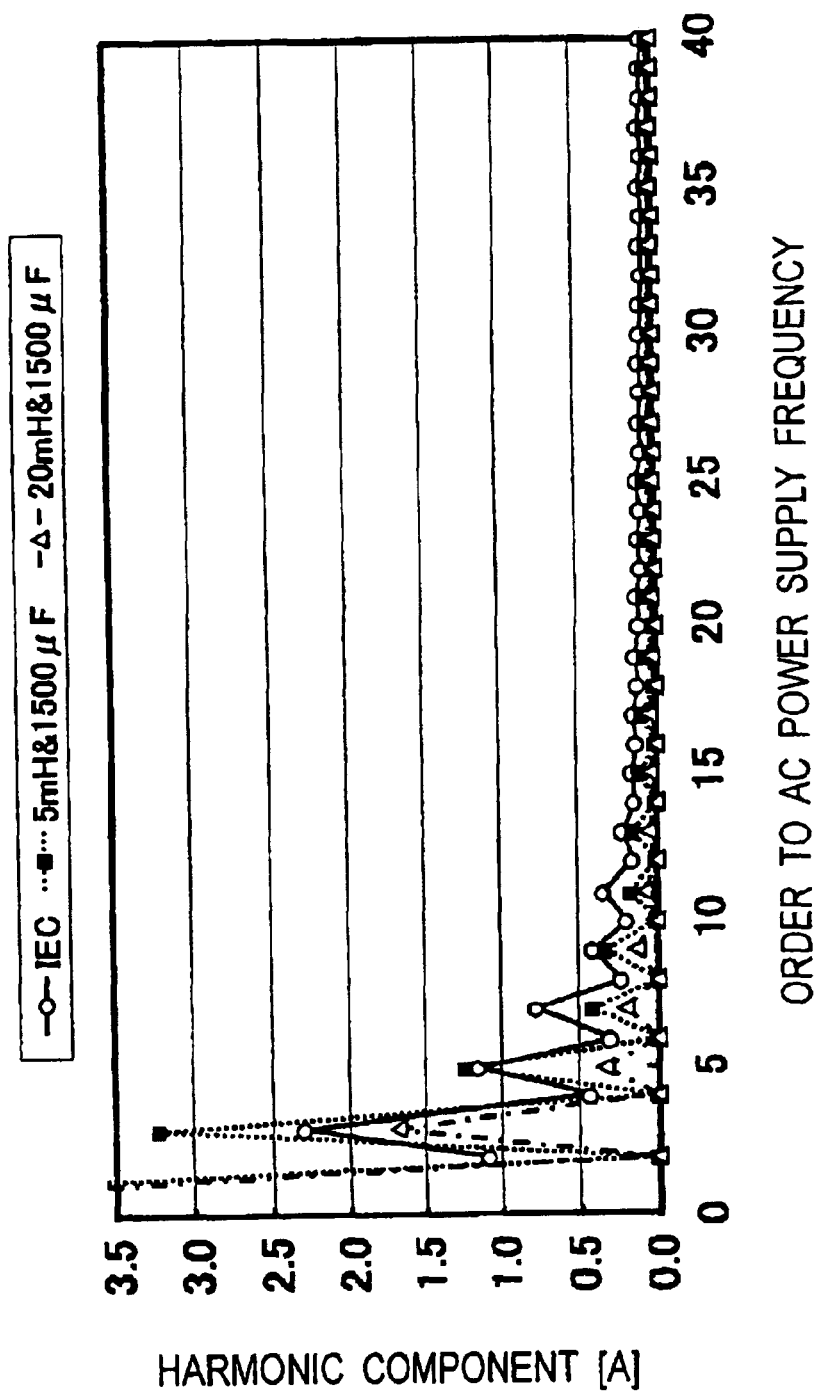
FIG. 13 is a diagrammatic view showing a relation between a harmonic component of an AC power supply current and an order to the AC power supply frequency in the prior art inverter controller shown in FIG. 11.

Meanwhile, a control circuit includes a V/F control pattern section 13, a motor voltage command generator 14, a PN voltage detector 15, a PN voltage corrector 16, a motor voltage command corrector 17, and a PWM controller 18. The V/F control pattern section 13 determines a motor voltage value to be applied to the induction motor 4 based on a speed command $\omega^*$ of the induction motor 4 applied from the outside. The motor voltage command generator 14 generates a motor voltage command value of the induction motor 4 based on the motor voltage value decided by the V/F control pattern section 13. The PN voltage detector 15 detects a DC voltage value of the inverter 3. The PN voltage corrector 16 provides a ratio of the DC voltage detection value of the inverter 3 obtained by the PN voltage detector 15 to a predetermined DC current voltage reference value of the inverter 3. The motor voltage command corrector 17 performs voltage correction of the motor voltage command value by multiplying the motor voltage command value obtained by the motor voltage command generator 14 by a PN voltage correction factor which is an output value of the PN voltage corrector 16 and generates a motor voltage command correction value for the induction motor 4. The PWM controller 18 generates a PWM signal to be applied to the inverter 3 based on the motor voltage command correction value generated by the motor voltage command corrector 17. Since the V/F control pattern section 13 is described in the prior art with reference to FIG. 11, its description is omitted here.

A specific method and operation of the inverter controller for driving the induction motor will be described hereinafter.

Motor voltage command values $v_u^*$, $v_v^*$ and $v_w^*$ are produced by the motor voltage command generator 14 through a calculation expressed by a formula (1)

(Formula 1)

$$\begin{cases} v_u^* = V_m \sin\theta_1 \\ v_v^* = V_m \sin(\theta_1 - 2\pi/3) \\ v_w^* = V_m \sin(\theta_1 + 2\pi/3) \end{cases} \quad (1)$$

Here, $V_m$ is a motor voltage value decided from the V/F control pattern, and $\theta 1$ is provided by time integrating the speed command $\omega^*$ as expressed by a formula (2).

(Formula 2)

$$\theta_1 = \int \omega^* dt \quad (2)$$

Figure 2:
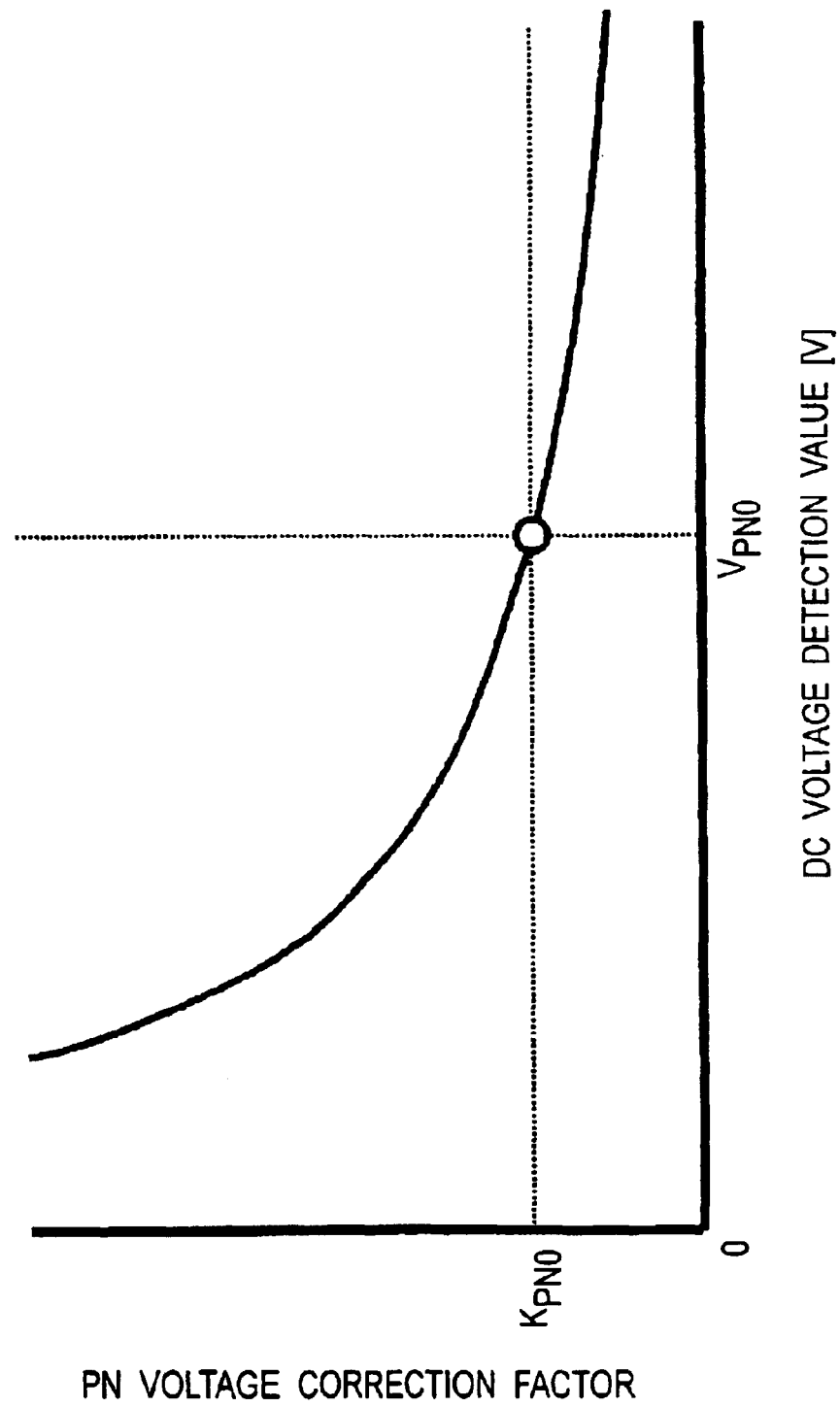
FIG. 2 is a graph view for explaining a function of a PN voltage corrector according to the first embodiment of the present invention.

FIG. 2 shows a graph for explaining a function of the PN voltage corrector 16 according to the first embodiment of the present invention, in which a PN voltage correction factor $k_{pn}$ is provided in the PN voltage corrector 16, as expressed by a formula (3) using a predetermined DC voltage reference value $V_{pn0}$ of the inverter 3 and a DC voltage detection value $v_{pn}$ of the inverter 3 obtained by the PN voltage detector 15.

(Formula 3)

$$k_{pn} = \frac{V_{pn0}}{v_{pn} + \delta_0} \quad (3)$$

Here, since the small-capacity capacitor is used in the present invention, there is a case that the DC voltage detection value $v_{pn}$ becomes zero, so that it is necessary to set a minute term $\delta_0$ in order to prevent zero dividing.

Instead of the minute term $\delta_0$ in the formula 3, the zero dividing can be prevented by setting a predetermined maximum value of the PN voltage correction factor in the PN voltage correction factor $k_{pn}$ when the DC voltage detection value $v_{pn}$ is zero or less.

In other words, the PN voltage correction factor $k_{pn}$ may be provided as expressed by a formula (4).

(Formula 4)

$$k_{pn} = \begin{cases} k_{pn\_max} & (v_{pn} \leq 0) \\ V_{pn0}/v_{pn} & (v_{pn} > 0) \end{cases} \quad (4)$$

Here, $k_{pn\_max}$ is the predetermined maximum value of the PN voltage correction factor.

In the motor voltage command corrector 17, motor voltage command correction values $v_{uh}^*$, $v_{vh}^*$ and $v_{wh}^*$ are provided as expressed by a formula (5) using the motor voltage command values $v_u^*$, $v_v^*$ and $v_w^*$ and the PN voltage correction factor $k_{pn}$.

(Formula 5)

$$\begin{cases} v_{uh}^* = k_{pn} \cdot v_u^* \\ v_{vh}^* = k_{pn} \cdot v_v^* \\ v_{wh}^* = k_{pn} \cdot v_w^* \end{cases} \quad (5)$$

As described above, in the inverter controller according to the present embodiment, since each of the phase voltage command values is corrected using the PN voltage correction factor, almost constant motor voltage can be applied even when the PN voltage fluctuates. Thus, a large-capacity capacitor becomes unnecessary and therefore a small-capacity capacitor can be used. By using such a small-capacity capacitor, the input current can be always applied to the motor and the power factor of the input current can be increased, so that the reactor can be reduced in size. Thus, by using the small-capacity reactor and the small-capacity capacitor, there can be attained a small, light and low-cost inverter controller for driving an induction motor. As a result, even when it is difficult or impossible to drive the induction motor because the inverter DC voltage largely fluctuates, the induction motor can be kept driving by operating the inverter so that the voltage applied to the induction motor remains almost constant.

In addition, it is noted here that the present invention is not limited to the inverter controller for driving the induction motor by the V/F control as described in the above embodiment, but can be applied to an inverter controller for driving an induction motor by a well-known vector control.

Furthermore, the present invention can be applied to either a compressor drive motor in an air conditioner in which a speed sensor such as a pulse generator and the like cannot be used, or a servo drive in which a speed sensor can be provided.

Embodiment 2

Figure 3:
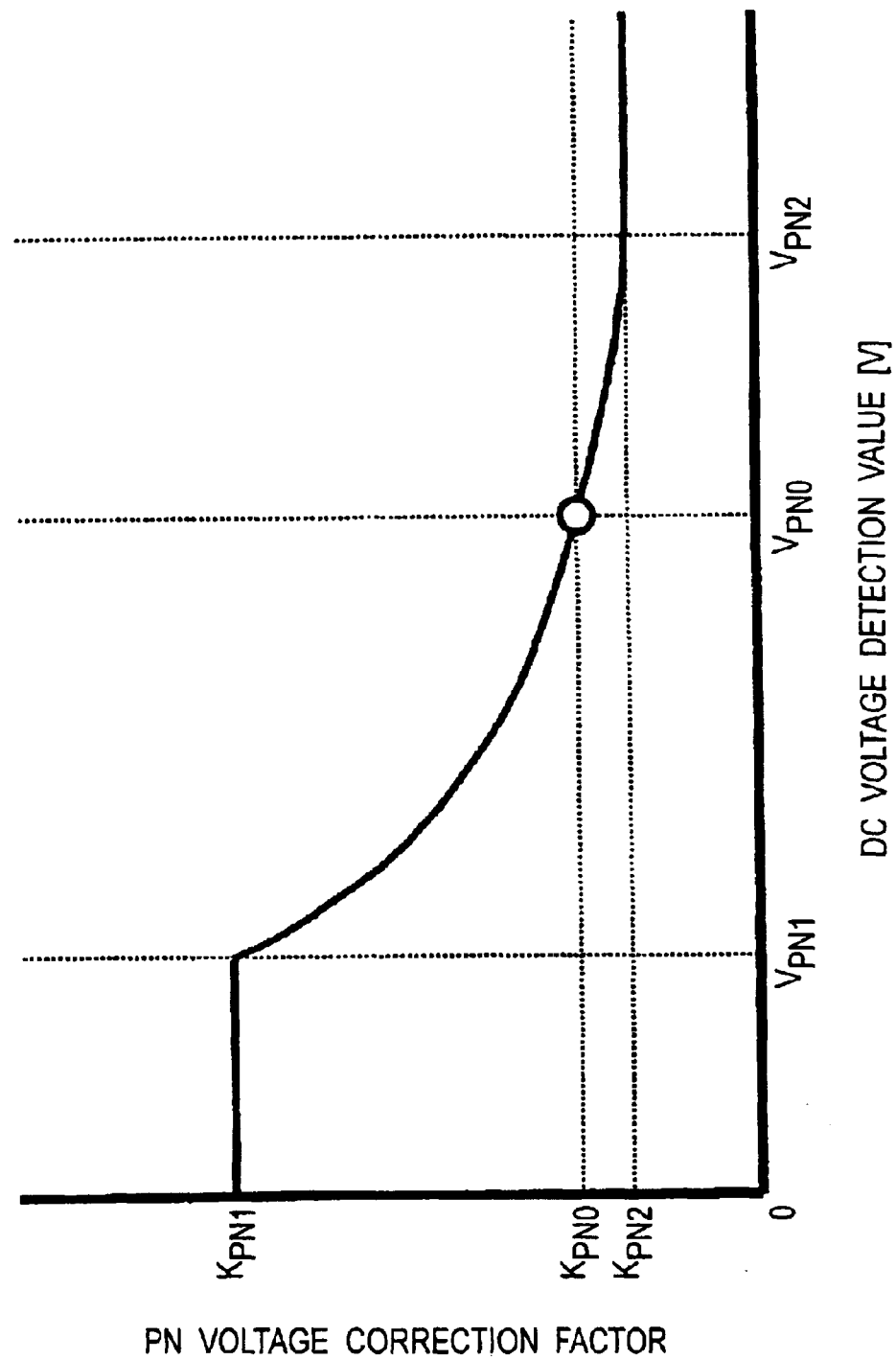
FIG. 3 is a graph view for explaining a function of a PN voltage corrector according to a second embodiment of the present invention.

FIG. 3 shows a graph for explaining a function of the PN voltage corrector 16 according to a second embodiment of the present invention. Referring to FIG. 3, the PN voltage correction factor $k_{pn}$ has a predetermined upper limit value $k_{pn1}$ and a lower limit value $k_{pn2}$, which is expressed by a formula (6).

(Formula 6)

$$k_{pn} = \begin{cases} k_{pn1} & (v_{pn} \leq V_{pn1}) \\ V_{pn0}/v_{pn} & (V_{pn1} < v_{pn} \leq V_{pn2}) \\ k_{pn2} & (v_{pn} > V_{pn2}) \end{cases} \quad (6)$$

Here, $V_{pn1}$ and $V_{pn2}$ are DC voltage detection values at the upper limit value $k_{pn1}$ and the lower limit value $k_{pn2}$ of the PN voltage correction factor, respectively.

It is noted here that the PN voltage correction factor $k_{pn}$ does not always have both the upper limit value $k_{pn2}$ and the lower limit value $k_{pn2}$ as shown in FIG. 3, and it may have only one of them depending on an operation condition.

In the conventional inverter controller for driving the induction motor including the inverter controller for driving the induction motor using the DC power supply apparatus as disclosed in the patent document 1, the induction motor can be kept driving under a load condition within an operation range, under the condition of using electric energy stored in an electrolytic capacitor having a large capacity such as 1000 μF or more. However, according to the present invention, since the small-capacity reactor and the small-capacity capacitor are used and electric energy stored in the small-capacity capacitor is small, even when the electric energy is insufficient, magnetic energy of the small-capacity reactor has to be used together in order to keep the induction motor driven. Therefore, a trade-off relation is provided between the driving characteristics of the induction motor and the electric characteristics of the AC power supply.

Therefore, when there is room for limit load tolerance of the induction motor, the electric characteristics of the AC power supply can be improved by suppressing excessive voltage correction.

Figure 5:
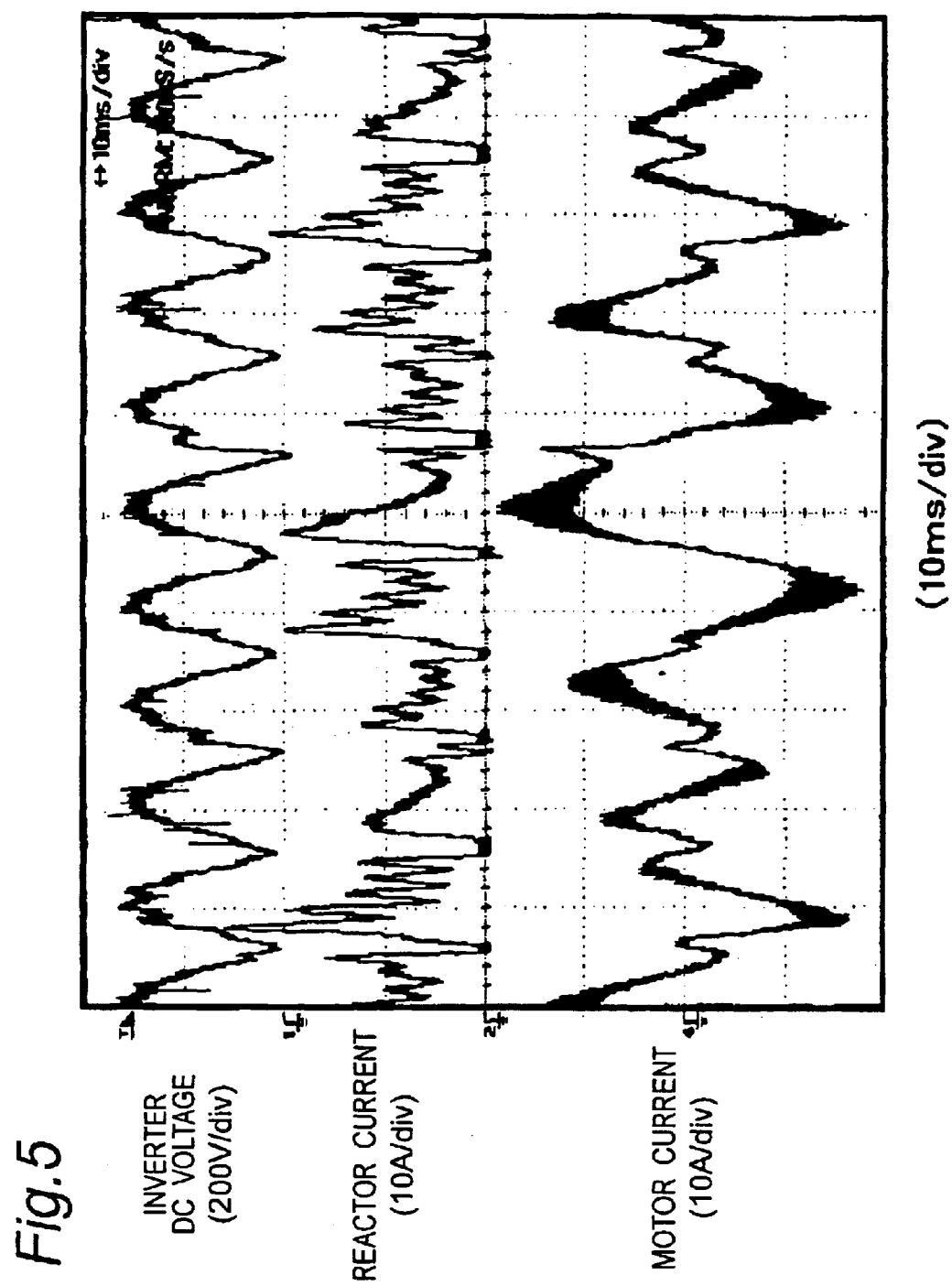
FIG. 5 is a graph view showing a first operation result of the inverter controller for driving the induction motor according to the present invention.
Figure 6:
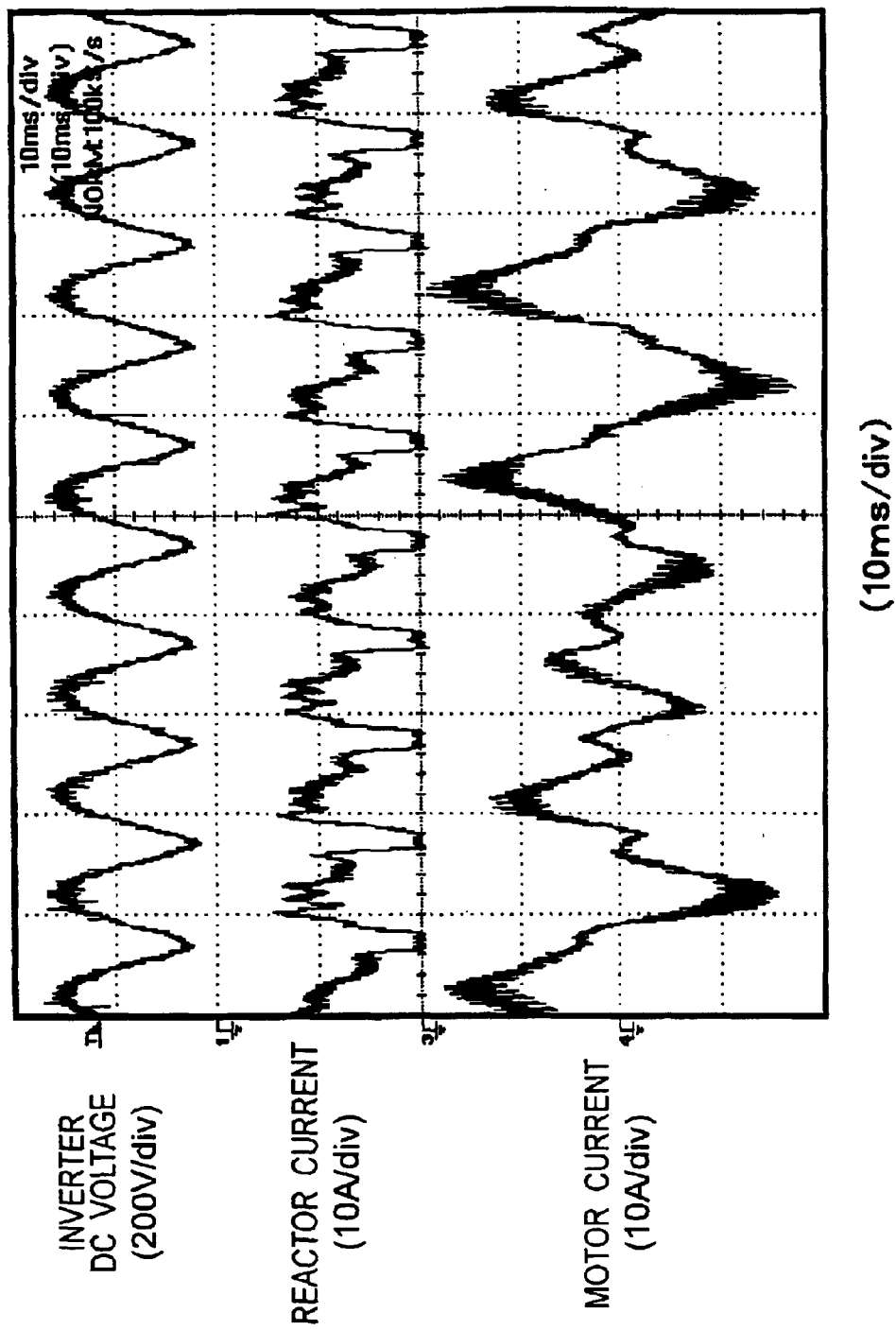
FIG. 6 is a graph view showing a second operation result of the inverter controller for driving the induction motor according to the present invention.

Here, FIGS. 5 and 6 show results when the inverter controller for driving the induction motor according to the present invention is operated. FIG. 5 shows a result when neither an upper limit value nor a lower limit value is set in the PN voltage correction factor $k_{pn}$, and FIG. 6 is a result when both of the upper limit value and the lower limit value are set in the PN voltage correction factor $k_{pn}$. Comparing between reactor current waveforms (each showing a current after flowing through the diode bridge) in FIG. 5 and FIG. 6, its effect is apparent.

In this example, an inductance value of the small-capacity reactor is 2 mH, the capacity of the small-capacity capacitor is 25 μF, the AC power supply is 220 V (50 Hz), an inverter operation frequency is 57 Hz (since the number of polarities of the motor is two in this case, the inverter operation frequency is equal to the motor speed command value), and an inverter carrier frequency is 5 kHz.

As described above, since the PN voltage correction factor $k_{pn}$ has at least one of the predetermined upper limit value $k_{pn1}$ and lower limit value $k_{pn2}$, fluctuation of the AC power supply current can be prevented, AC power supply power factor is improved and a harmonic component of the AC power supply current can be suppressed.

Embodiment 3

Figure 4:
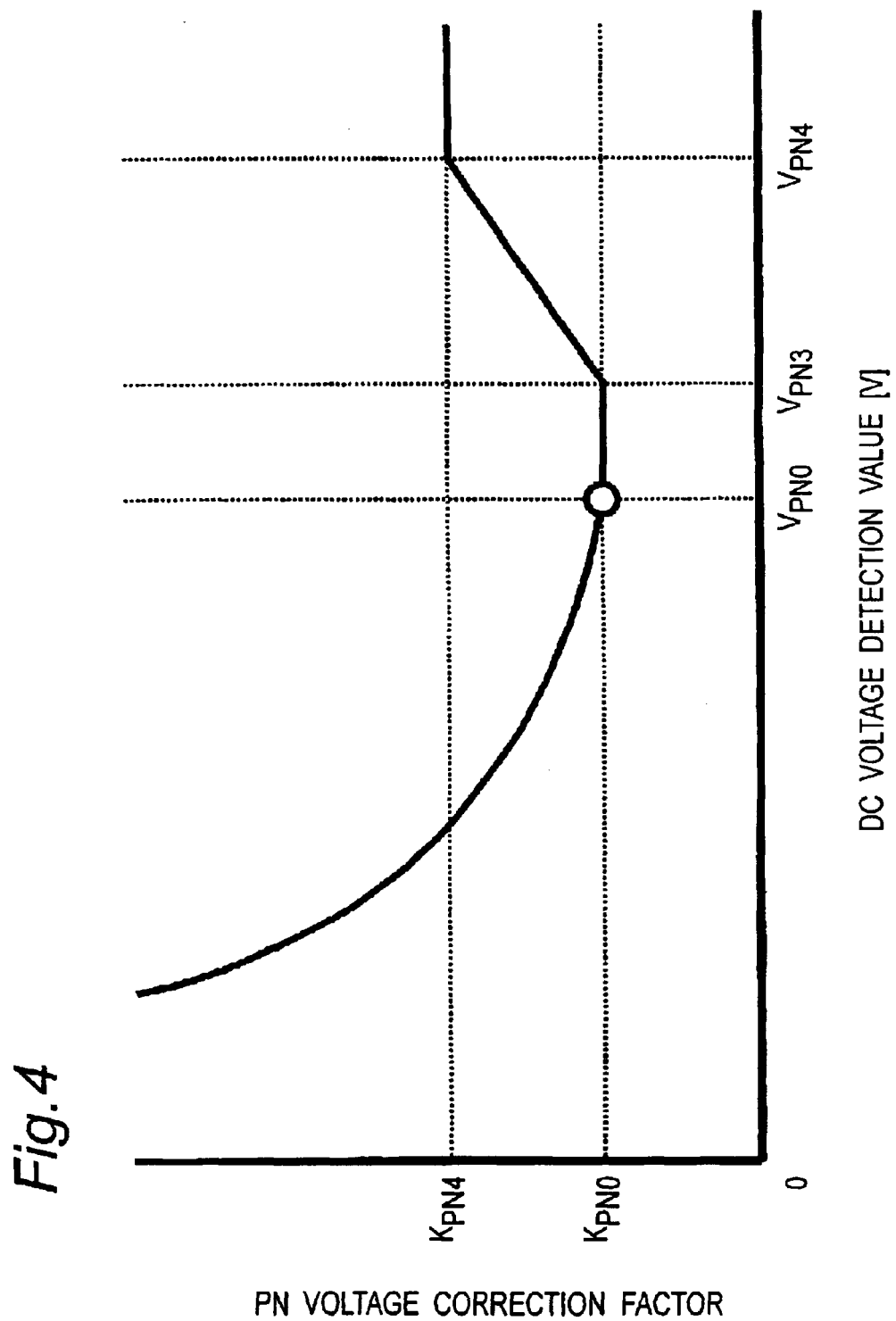
FIG. 4 is a graph view for explaining a function of a PN voltage corrector according to a third embodiment of the present invention.

FIG. 4 shows a graph for explaining a function of the PN voltage corrector 16 according to a third embodiment of the present invention. Referring to FIG. 4, when the DC voltage detection value $v_{pn}$ is larger than the DC voltage reference value $V_{pn0}$, the PN voltage correction factor $k_{pn}$ is increased in proportion to the DC voltage detection value $v_{pn}$, which is expressed by a formula (7).

(Formula 7)

$$k_{pn} = \begin{cases} V_{pn0}/(v_{pn} + \delta_0) & (v_{pn} \leq V_{pn0}) \\ k_{pn0} & (V_{pn0} < v_{pn} \leq V_{pn3}) \\ \dfrac{k_{pn4} - k_{pn0}}{V_{pn4} - V_{pn3}}(v_{pn} - V_{pn3}) + k_{pn4} & (V_{pn3} < v_{pn} \leq V_{pn4}) \\ k_{pn4} & (v_{pn} > V_{pn4}) \end{cases} \quad (7)$$

Here, $\delta_0$ is a minute term for preventing zero dividing, in which switching grace of calculation for providing the PN voltage correction factor $k_{pn}$ is set so that the PN voltage correction factor $k_{pn}$ may not abruptly change in a region where the current voltage detection value $v_{pn}$ is in a range of $V_{pn0}$ to $V_{pn3}$, and the upper limit value $k_{pn4}$ is set when the PN voltage correction factor $k_{pn}$ is increased in a region where the current voltage detection value $v_{pn}$ exceeds $V_{pn4}$.

However, the switching grace or the upper limit value $V_{pn4}$ is not always required to be set and it may not be set depending on the operation condition.

In this operation, it is known in general that an output torque of the induction motor is proportional to the second power of a voltage applied to the motor (referring to, for example, page 33 in the aforementioned non-patent document 1. When the limit load tolerance of the induction motor is insufficient, the voltage applied to the motor is increased by performing further voltage correction in a region where the DC voltage detection value $v_{pn}$ is larger than the DC voltage reference value $V_{pn0}$, so that the induction motor can be kept driving.

As described above, the output torque of the induction motor can be improved by increasing the PN voltage correction factor $k_{pn}$ in the case where the DC voltage detection value $v_{pn}$ is larger than the DC voltage reference value $V_{pn0}$.

Embodiment 4

Hereinafter, a specific method will be described regarding to setting of the inverter operation frequency according to the present invention.

Since the small-capacity capacitor is used in the inverter controller for driving the induction motor of the present invention, the inverter DC voltage largely fluctuates at a frequency twice as an AC power supply frequency $f_s$ as shown in FIG. 5 or FIG. 6.

Therefore, a resonant phenomenon is generated in synchronization with the frequency (frequency of a twice of the AC power supply frequency) where the inverter DC voltage fluctuates, when the inverter operation frequency $f_1$ becomes an even-numbered multiple of the AC power supply frequency $f_s$.

Figure 7:
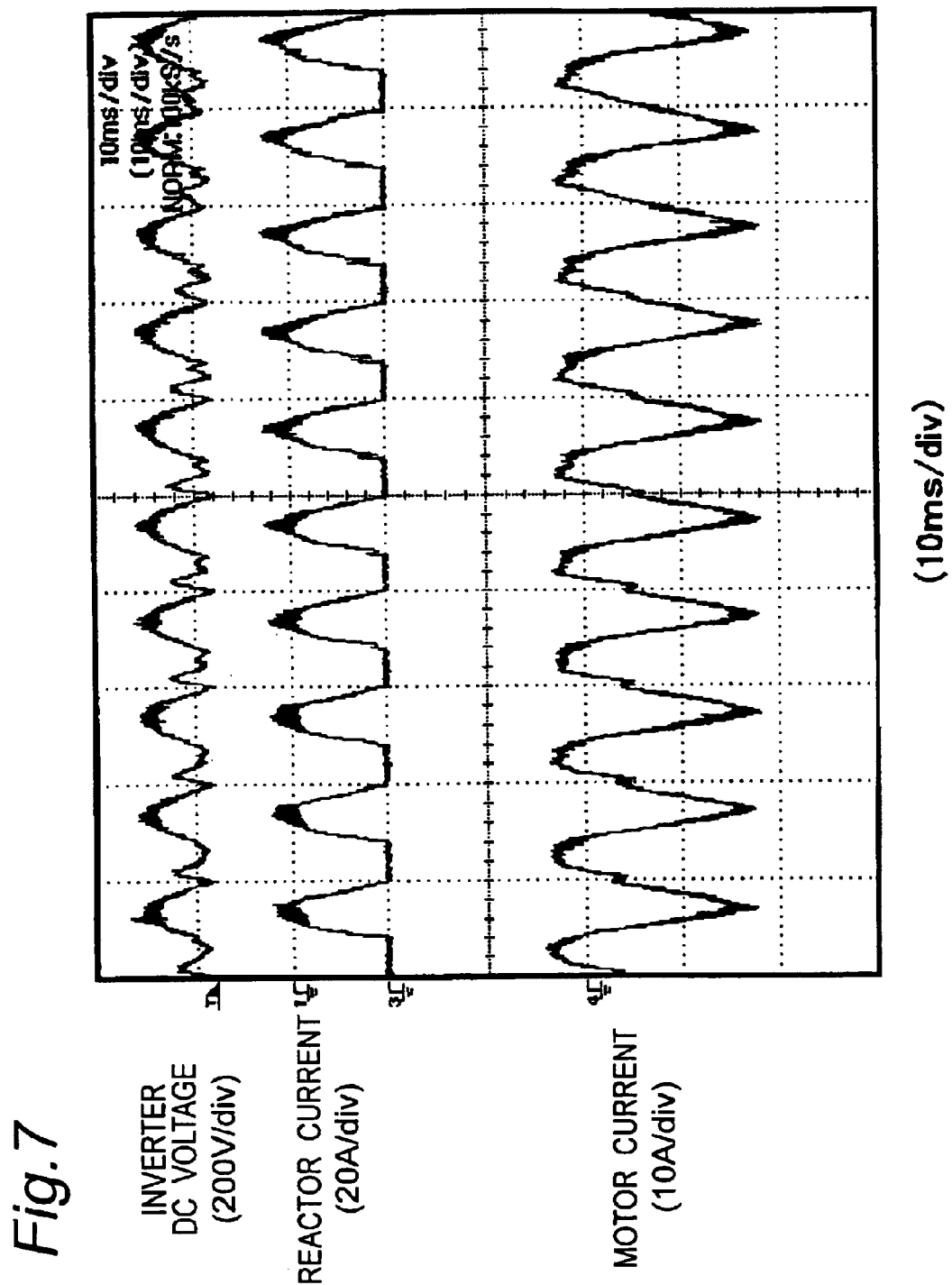
FIG. 7 is a graph view showing a third operation result of the inverter controller for driving the induction motor according to the present invention.

FIG. 7 shows a result when the inverter controller for driving the induction motor of the present embodiment is operated, which shows the operation result when the inverter operation frequency $f_1$ becomes twice of the AC power supply frequency $f_s$. In this operation, the resonant phenomenon is generated in synchronization with the frequency at which the inverter DC voltage fluctuates, and it is apparent that a negative DC component is superposed on the motor current in FIG. 7.

Therefore, a brake torque is generated in the induction motor, and there is generated an adverse effect such that the output torque is decreased and a motor loss is increased.

In this example, an inductance value of the small-capacity reactor is 0.5 mH, the capacity of the small-capacity capacitor is 10 μF, the AC power supply is 220 V (50 Hz), an inverter operation frequency is 100 Hz (since the number of polarities of the motor is two in this case, the inverter operation frequency is equal to the motor speed command value), and the inverter carrier frequency is 5 kHz.

Thus, when, in setting the inverter operation frequency $f_1$, it is necessary to prevent the inverter operation frequency $f_1$ from being constantly fixed to a case shown by a formula (8).

(Formula 8)

$$f_1 = 2nf_s \pm \Delta f \qquad (8)$$

Here, n is an integer and Δf is a predetermined frequency width, and the frequency width Δf is set such that an influence of the above resonant phenomenon may be reduced basically.

When the inverter operation frequency $f_1$ exceeds the resonant frequency obtained by the formula (8), the inverter operation frequency $f_1$ is changed in a breath in a process of acceleration or deceleration so that the inverter operation frequency $f_1$ is prevented from being fixed at the resonant frequency.

It is noted here that the frequency width Δf is not always required to be set, and it may not be set depending on the operation condition (such as light load state) (i.e., in this case, it may be set as Δf=0).

Thus, an unstable operation of the induction motor is prevented by avoiding the resonant phenomenon between the inverter frequency and the AC power supply frequency, so that a stable driving can be implemented.

Embodiment 5

The following describes a specific method regarding a specification decision of the small-capacity capacitor and the small-capacity reactor according to the present invention.

According to the inverter controller for driving the induction motor of the present invention, in order to meet the IEC standard by preventing the harmonic component of the AC power supply current, the combination of the small-capacity capacitor and the small-capacity reactor is decided so that the resonant frequency $f_{LC}$ (i.e., LC resonant frequency) between the small-capacity capacitor and the small-capacity reactor may be larger than forty-fold of the AC power supply frequency $f_s$.

Here, when it is assumed that the capacity of the small-capacity capacitor is C[F] and the inductance value of the small-capacity reactor is L[H], the LC resonant frequency $f_{LC}$ is expressed by a formula (9).

(Formula 9)

$$f_{LC} = \frac{1}{2\pi\sqrt{LC}} \qquad (9)$$

That is, the combination between the small-capacity capacitor and the small-capacity reactor is decided so as to satisfy an inequality $f_{LC} > 40\,f_s$ (because the harmonic component of the AC power supply current is defined up to the fortieth harmonic component in the IEC standard).

As described above, the harmonic component of the AC power supply current is prevented by deciding the combination between the small-capacity capacitor and the small-capacity reactor, so that the IEC standard can be met.

Next, the following describes the decision of the capacity of the small-capacity capacitor. When the inverter stops, the small-capacity capacitor absorbs regenerative energy of the induction motor and the DC voltage value of the inverter is increased. Then, the capacity of the small-capacity capacitor is decided such that the maximum value of the DC voltage may be smaller than a withstand voltage of the element. Here, the regenerative energy of the induction motor is magnetic energy stored in the inductance component of the induction motor just before the stop.

Constituted as described above, peripheral circuits can be prevented from being destroyed by deciding the capacity of the small-capacity capacitor so that the maximum value of the inverter DC voltage may be smaller than the withstand voltage of each driving element.

In addition, the inductance value of the small-capacity reactor can be automatically decided by the above method.

Embodiment 6

The following describes a specific method of setting the inverter carrier frequency.

According to the inverter controller for driving the induction motor of the present invention, since the electric energy stored in the small-capacity capacitor is small as described in the embodiment 2, when the electric energy is insufficient, magnetic energy of the small-capacity reactor has to be used together in order to keep the induction motor driven. Therefore, a reactor current waveform is considerably affected by the carrier frequency of the inverter. Here, the reactor current waveform is a current after passed through the diode bridge and almost equal to the current of an absolute value of the AC power supply current.

Therefore, the carrier frequency of the inverter is set so as to satisfy the predetermined AC power supply power factor value in the inverter controller for driving the induction motor of the present invention.

Figure 8:
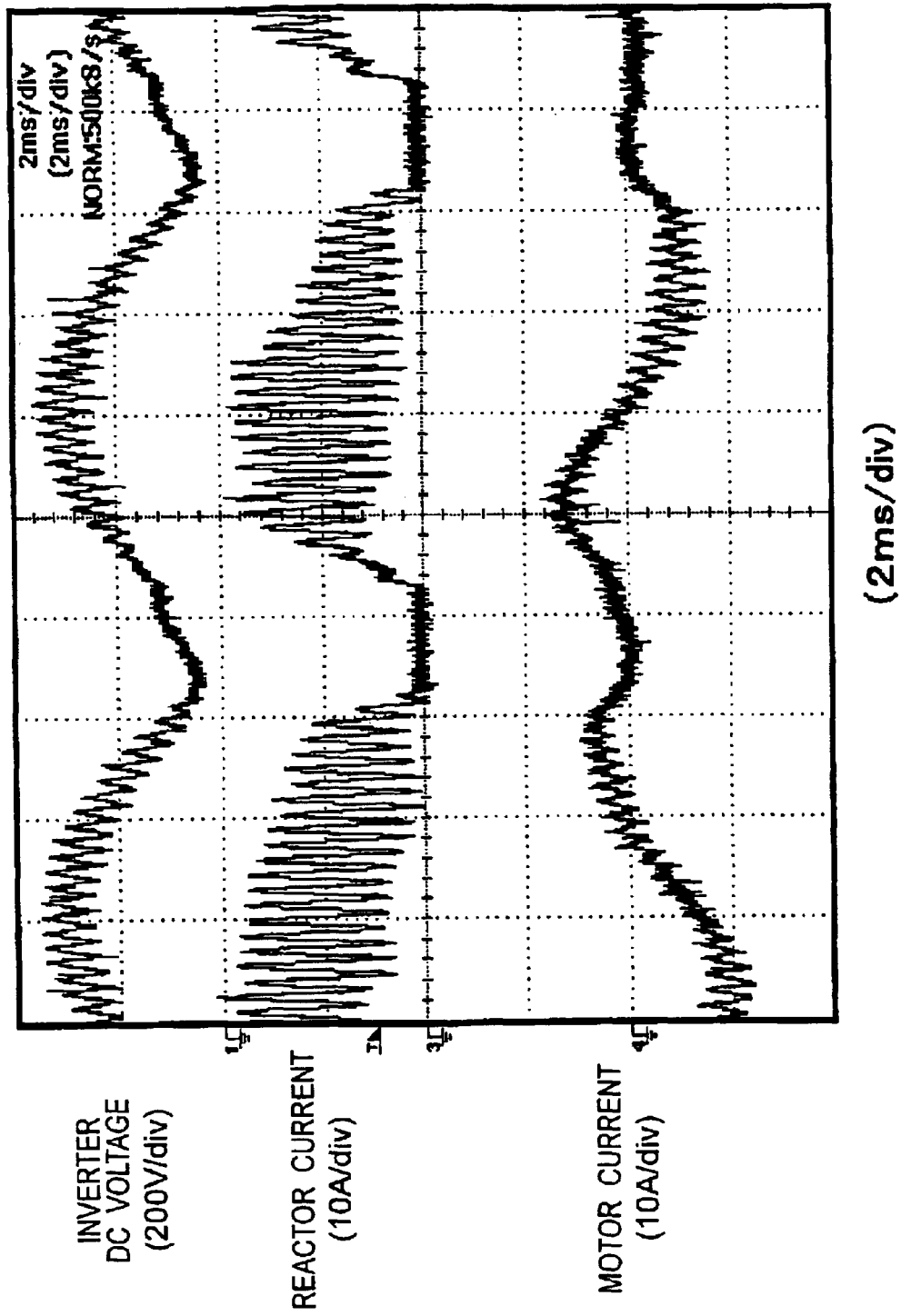
FIG. 8 is a graph view showing a fourth operation result of the inverter controller for driving the induction motor according to the present invention.
Figure 9:
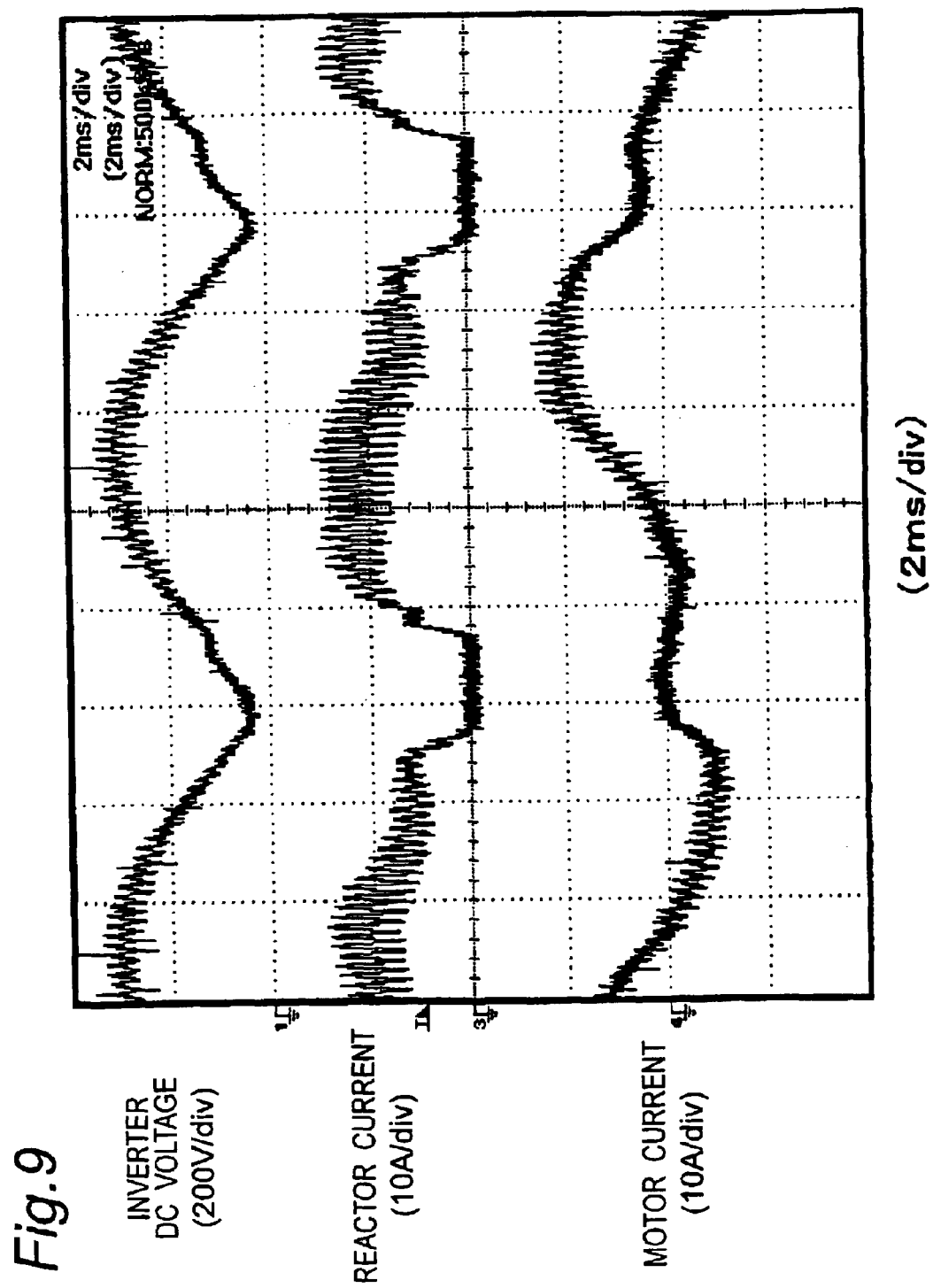
FIG. 9 is a graph view showing a fifth operation result of the inverter controller for driving the induction motor according to the present invention.
Figure 10:
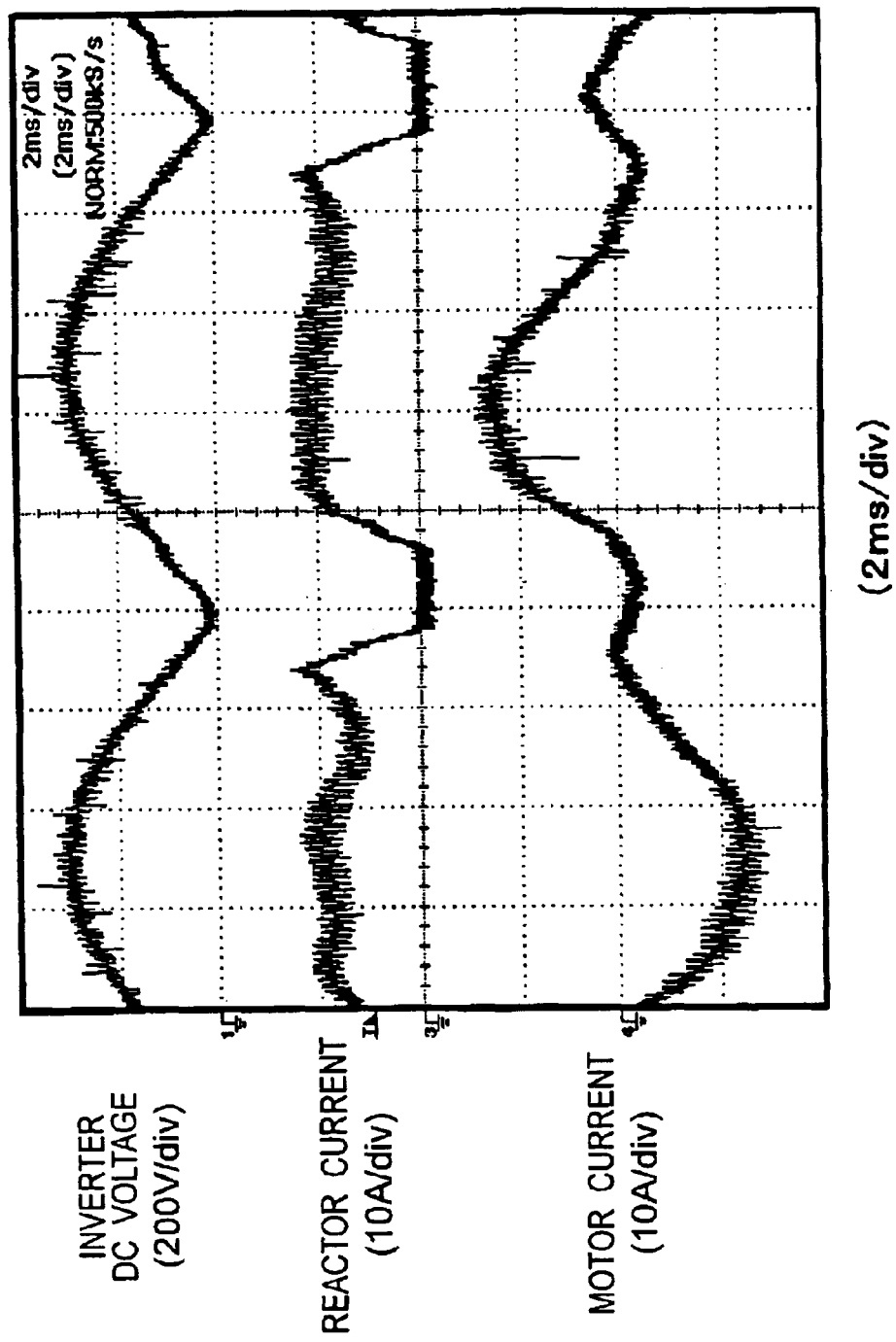
FIG. 10 is a graph view showing a sixth operation result of the inverter controller for driving the induction motor according to the present invention.

FIGS. 8 through 10 show results when the inverter controller for driving the induction motor of the present invention is operated. FIGS. 8, 9 and 10 show the operation results when carrier frequencies are 3.3 kHz, 5 kHz and 7.5 kHz, respectively. When reactor current waveforms are compared, it is found that the reactor current (or AC power supply current) largely depends on the carrier frequency.

Respective AC power supply power factors were measured by a digital power meter and the measurement results were: 0.878 when the carrier frequency is 3.3 kHz in FIG. 8; 0.956 when the carrier frequency is 5 kHz in FIG. 9; and 0.962 when the carrier frequency is 7.5 kHz in FIG. 10.

In this case, the inductance value of the small-capacity reactor is 0.5 mH, the capacity of the small-capacity capacitor is 10 µF, the AC power supply is 220 V (50 Hz), the inverter operation frequency is 57 Hz (since the number of polarities of the motor is two in this case, the inverter operation frequency is equal to a motor speed command value), and the input power of the AC power supply is 900 W.

Here, when the predetermined AC power supply power factor is 0.9, for example, the carrier frequency may be set in a range of 3.3 kHz to 5 kHz, and the carrier frequency is set so as to be lowest while the predetermined AC power supply power factor value (i.e., 0.9 in this example) is satisfied in the end.

As described above, the predetermined AC power supply power factor value can be satisfied, and an inverter loss can be suppressed so as to be the requisite minimum by setting the carrier frequency at the requisite minimum.

It is noted here that, although the induction motor is described in the above embodiments, the present invention can be applied to another type of motors.

As can be apparent from the above description, according to the present invention, an inverter controller for driving a motor, includes: an AC power supply for supplying an AC power; a rectifier formed of a diode bridge for rectifying the AC power to be converted to DC power; a reactor having a predetermined small capacity which is connected to the rectifier, for improving a power factor of the AC power supply; an inverter which converts the DC power to AC power for driving the motor; and a capacitor having a predetermined small capacity which is connected between DC bus lines of the inverter to absorb regeneration energy from the motor. The inverter controller further includes: a motor voltage command generator which generates a motor voltage command value of the motor, based on a speed command value of the motor applied from the outside; a PN voltage detector which detects a DC voltage value of the inverter; a PN voltage corrector which calculates a ratio of the DC voltage detection value of the inverter obtained by the PN voltage detector to a predetermined DC voltage reference value of the inverter to thereby generate a PN voltage correction factor; and a motor voltage command corrector which generates a motor voltage command correction value of the motor.

Preferably, the motor voltage command corrector obtains the motor voltage command correction value of the motor by multiplying the motor voltage command value obtained by the motor voltage command generator by the PN voltage correction factor which is generated by the PN voltage corrector.

By this constitution, a small, light and low-cost inverter controller for driving the motor can be implemented by using the small-capacity reactor and the small-capacity capacitor. As a result, even when it is difficult or impossible to drive the motor because the inverter DC voltage largely fluctuates, the motor can be kept driving by operating the inverter so that the voltage applied to the motor may stay almost constant.

Further, according to the present invention, the PN voltage corrector preferably provides the PN voltage correction factor by dividing the DC voltage reference value by the DC voltage detection value, and sets a predetermined maximum value of the PN voltage correction factor as the PN voltage correction factor when the DC voltage detection value is zero or less.

By this constitution, the motor can be kept driving even when the inverter DC voltage largely fluctuates to be zero or less.

Still further, the PN voltage correction factor generated by the PN voltage corrector has at least a predetermined upper limit value or a predetermined lower limit value.

By this constitution, the motor can be kept driving even when the inverter DC voltage largely fluctuates, the AC power supply current can be prevented from fluctuating because the predetermined upper limit value or the lower limit value is provided, the AC power supply power factor can be improved, and the harmonic component of the AC power supply current can be prevented.

Still further, the PN voltage corrector increases the PN voltage correction factor in proportion to the DC voltage detection value when the DC voltage detection value is larger than the DC voltage reference value.

By this constitution, the motor can be kept driving even when the inverter DC voltage largely fluctuates, and the output torque of the motor can be improved by increasing the PN voltage correction factor when the inverter DC voltage is more than the DC voltage reference value.

Still further, an inverter operation frequency is prevented from being constantly fixed at a resonant frequency in which the inverter operation frequency is an even-numbered multiple of an AC power supply frequency and in a range having a predetermined frequency width around the resonant frequency.

By this constitution, an unstable operation of the motor can be prevented by avoiding a resonant phenomenon between the inverter frequency and the AC power supply frequency, and the stable driving can be implemented.

Still further, a combination of the small-capacity reactor and the small-capacity capacitor is decided so that a resonant frequency between the small-capacity reactor and the small-capacity capacitor is made larger than the forty-fold of the AC power supply frequency.

By this constitution, the harmonic component of the AC power supply current can be prevented and the IEC standard can be satisfied.

Still further, the capacity of the small-capacity capacitor is decided so that a maximum value of the DC voltage value, which increases when the inverter stops, is made smaller than a withstand voltage of the capacitor.

By this constitution, the peripheral circuit can be prevented from being destroyed by deciding the capacity of the small-capacity capacitor so that the maximum value of the inverter DC voltage may be smaller than the withstand voltage of each driving element.

Still further, a carrier frequency of the inverter is decided so as to satisfy a predetermined AC power supply power factor value.

By this constitution, the predetermined AC power supply power factor value can be satisfied and the inverter loss can be suppressed to the requisite minimum by setting the carrier frequency at the requisite minimum.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An inverter controller for driving a motor, comprising:
an AC power supply for supplying an AC power;
a rectifier formed of a diode bridge for rectifying the AC power to be converted to DC power;
a reactor having a predetermined small capacity which is connected to the rectifier, for improving a power factor of the AC power supply;
an inverter which converts the DC power to AC power for driving the motor;
a capacitor having a predetermined small capacity which is connected between DC bus lines of the inverter to absorb regeneration energy from the motor;
a motor voltage command generator which generates a motor voltage command value of the motor, based on a speed command value of the motor applied from the outside;
a positive neutral (PN) voltage detector which detects a DC voltage value of the inverter;
a PN voltage corrector which calculates a ratio of the DC voltage detection value of the inverter obtained by the PN voltage detector to a predetermined DC voltage reference value of the inverter to thereby generate a PN voltage correction factor; and
a motor voltage command corrector which generates a motor voltage command correction value of the motor,
wherein the PN voltage corrector provides the PN voltage correction factor by dividing the DC voltage reference value by the DC voltage detection value, and sets a predetermined maximum value of the PN voltage correction factor as the PN voltage correction factor when the DC voltage detection value is zero or less.

2. The inverter controller according to claim 1, wherein the motor voltage command corrector obtains the motor voltage command correction value of the motor by multiplying the motor voltage command value obtained by the motor voltage command generator by the PN voltage correction factor which is generated by the PN voltage corrector.

3. The inverter controller according to claim 1, wherein the PN voltage correction factor generated by the PN voltage corrector has at least a predetermined upper limit value or a predetermined lower limit value.

4. The inverter controller according to claim 1, wherein the PN voltage corrector increases the PN voltage correction factor in proportion to the DC voltage detection value when the DC voltage detection value is larger than the DC voltage reference value.

5. The inverter controller according to claim 1, wherein an inverter operation frequency is prevented from being constantly fixed at a resonant frequency in which the inverter operation frequency is an even-numbered multiple of an AC power supply frequency and in a range having a predetermined frequency width around the resonant frequency.

6. The inverter controller according to claim 1, wherein a combination of the small-capacity reactor and the small-capacity capacitor is decided so that a resonant frequency between the small-capacity reactor and the small-capacity capacitor is made larger than the forty-fold of the AC power supply frequency.

7. The inverter controller according to claim 1, wherein the capacity of the small-capacity capacitor is decided so that a maximum value of the DC voltage value, which increases when the inverter stops, is made smaller than a withstand voltage of the capacitor.

8. The inverter controller according to claim 1, wherein a carrier frequency of the inverter is decided so as to satisfy a predetermined AC power supply power factor value.

9. An air conditioner which includes a converter apparatus for converting AC power to DC power and an inverter apparatus for converting the DC power converted by the converter to AC power of a variable voltage and a variable frequency and supplying the AC power to a motor for driving a compressor,
wherein the inverter apparatus comprises:
an AC power supply for supplying an AC power;
a rectifier formed of a diode bridge for converting the AC power to DC power;
a reactor having a predetermined small capacity which is connected to the rectifier, for improving a power factor of the AC power supply;
an inverter which converts the DC power to AC power for driving the motor;
a capacitor having a predetermined small capacity which is connected between DC bus lines of the inverter to absorb regeneration energy from the motor;
a motor voltage command generator which generates a motor voltage command value of the motor, based on a speed command value of the motor applied from the outside;
a positive neutral (PN) voltage detector which detects a DC voltage value of the inverter;
a PN voltage corrector which calculates a ratio of the DC voltage detection value of the inverter obtained by the PN voltage detector to a predetermined DC voltage reference value of the inverter to thereby generate a PN voltage correction factor; and
a motor voltage command corrector which generates a motor voltage command correction value of the motor,
wherein the PN voltage corrector provides the PN voltage correction factor by dividing the DC voltage reference value by the DC voltage detection value, and sets a predetermined maximum value of the PN voltage correction factor as the PN voltage correction factor when the DC voltage detection value is zero or less.

* * * * *